United States Patent [19]

Humphrey

[11] 3,902,376

[45] Sept. 2, 1975

[54] CONTINUOUSLY VARIABLE MECHANICAL SYNCHRONIZER

[76] Inventor: John R. Humphrey, 8206 Edgewood, Mentor, Ohio 44060

[22] Filed: Dec. 7, 1973

[21] Appl. No.: 422,667

[52] U.S. Cl. .......... 74/217 R; 74/217 CV; 226/111; 74/117
[51] Int. Cl.² .......................................... F16H 9/00
[58] Field of Search ........ 74/216.5, 217 R, 217 CV, 74/242.14, 242.8, 242.11, 393, 395, 219, 117; 226/111

[56] References Cited
UNITED STATES PATENTS

| | | | |
|---|---|---|---|
| 2,212,348 | 8/1940 | Ludington | 74/242.8 |
| 2,352,797 | 7/1944 | Miller | 74/217 CV |
| 3,130,981 | 4/1964 | Christenson et al. | 74/216.5 |
| 3,136,466 | 6/1964 | Antonucci | 226/111 |
| 3,166,947 | 1/1965 | Hendershot | 74/216.5 |
| 3,529,483 | 9/1970 | Warnock | 74/217 CV |

*Primary Examiner*—Samuel Scott
*Assistant Examiner*—Allan R. Bucke
*Attorney, Agent, or Firm*—P. D. Golrick

[57] ABSTRACT

A sprocket chain reeved around an input shaft drive sprocket and six sprockets equal in size to, and with axes parallel to, the input shaft, four being operatively fixed and rectangularly located and two being slide-carriage-mounted within the rectangle to engage opposed reaches of the chain between opposed fixed sprocket pairs, delivers rotational motion through one fixed sprocket to an output shaft; and a carriage actuating lever having one end pivoted to the slide, the other end cam-follower-engaged in an input shaft face cam, and therebetween a fulcrum block, selectably slideably positionable on the lever up to a position of coincidence with the carriage slide end pivot, affords a cyclical change in the output speed relative to input speed as programmed or determined by the face cam contour and with high-low ratios of output to input established by the fulcrum setting.

12 Claims, 5 Drawing Figures

FIG. 1

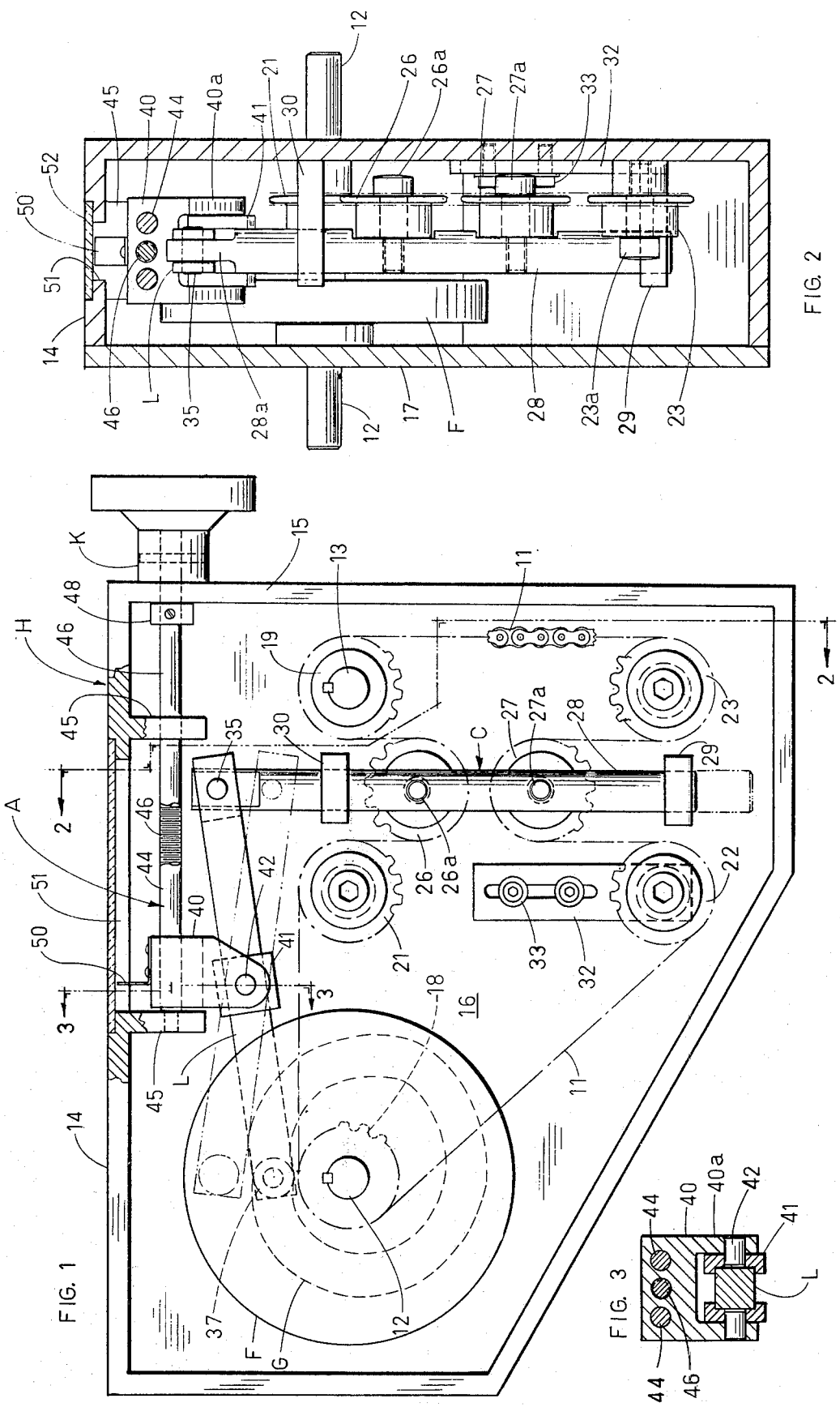

CONTINUOUSLY VARIABLE MECHANICAL SYNCHRONIZER

The present invention is generally concerned with a motion converting mechanism or device which for each rotation of a uniformly constantly driven rotational input can provide a rotational output having at least two distinct velocity ratios relative to and having a predetermined cyclic relation to input. More particularly the invention relates to a device of the character described wherein speed ratios may be continuously varied (even during operation) with the possibility moveover of obtaining through the entire output rotation a constant speed relative to input; and the further possibility even of obtaining at different parts of the rotational input cycle or rotation a reversal of the output direction or sense.

More particularly the present invention pertains to a class of devices or mechanisms wherein motion is communicated from a rotational input shaft to a rotational output shaft through a principal or main driving system including certain shiftable elements which when in fact not shifted, would result in the system producing a constant ratio of output to input rotation; but including also a motion modifying means driven by the input to shift elements in such fashion that a component of motion is algebraically added to the principal communicated motion thereby to vary the output rotation.

By the present invention there is provided, as principal transmission means for communicating rotational motion from a rotary input shaft to a rotary output shaft, a non-slipping flexible drive such as a timing belt or sprocket chain, and as supporting means therefor rotary elements such as sprockets or pulleys certain of which are operatively fixed in location in a housing, others shiftable; and motion modifying means including first a rotary cam rotationally driven from the input shaft for a constant relation of input and cam rotary speeds, and secondly a cam follower and linkage means connecting the follower to a shiftable element. The cam-produced shifting motion thereby supplies a motion component algebraically added to the motion transmitted by the principal transmission means to the output shaft; the cam, cam follower and linkage means being adapted to produce cyclicly at least two said motion components which are respectively constant relative to input motion over predetermined intervals; and including further, means for selectably adjusting the linkage means, even while the device is in operation, to vary the ratio of those two motion components.

In the particularly disclosed embodiment, the principal drive or transmission means is provided by an input shaft sprocket and an output shaft sprocket; three idler sprockets in a fixed, as it were a rectangular, array with the input or output sprocket, here specifically with the output sprocket; a further pair of idler sprockets having a fixed spacing to each other; and sprocket chain reeved about the said sprockets with an opposed reentrant parallel reeving on the said further pair.

As the motion modifying means, a slide bar carriage supports the further idler sprocket pair for shifting in the common plane of all sprockets; and a lever bar, pivoted relative to the housing and bearing the cam follower, has also a pivot connection to the slide bar, so that, since from the cam rotational motion there is derived and applied a reciprocating motion in the carriage and shiftable idlers, the latter are effective to apply motion to the chain and hence to the output by increasing the effective chain path between two fixed sprockets, while at the same time shortening the chain portion between an opposed sprocket pair.

By appropriately contouring two portions of the cam to provide over certain periods constant rectilinear motion in the carriage in each of the two directions, two distinct constant output speeds are obtained at different portions of the input shaft rotational cycle; and with the fulcrum axis for the lever bar selectably adjustable, the ratios of these two speeds may be varied relative to the input and relative to each other. Further by bringing the fulcrum axis coincident with the pivotal connection to the slide, a constant output over each rotation of the input is obtained.

However, though, the specifically disclosed embodiment of the invention utilizes and is described in terms of a sprocket chain drive, other flexible non-slipping and non-stretching elements and appropriate rotary supports and engagements may be used, and indeed other types of principal drive systems to a shiftable component of which a constant shifting motion may be applied at a certain time to result in an output motion modification of the character described.

A device embodying the invention has many and varied applications, but has particular utility and advantages in apparatus requiring driving a web of material continuously and also driving devices operating repeatedly upon the web at successive longitudinal locations. In such apparatus generally first it is required that the operation be carried out with an element moving for a time with the same speed as the web, and secondly for general flexibility of the apparatus, it is desirable that longitudinal spacing along the web at which such operation is carried out, be readily adjustable. For such purposes then it is required to synchronize the operation of the said element with the extent of web advance, as well as with the web speed.

It is the general object of the invention to provide an improved device of the character described. It is a more particular object to this invention to provide a mechanical continuously variable synchronizer.

Another object is to provide a mechanical synchronizer which is continuously variable over at least a certain range of the ratio of two output speeds obtainable.

Another object is to provide a device of the character described in which the cyclic behavior of the output relative to the input can be distinctly changed by a cam substitution.

A still further object of the invention is to provide a device of the character described which is relatively simple structurally, rugged and of comparatively low cost for the function attained.

Other objects and advantages will appear from the following description and the drawings of one embodiment of the invention wherein:

FIG. 1 is a side view of a transmission unit with a housing cover removed;

FIG. 2 is an irregular section taken as indicated by the line 2—2 in FIG. 1;

FIG. 3 is a detail section taken at 3—3 in FIG. 1;

Figure 4:
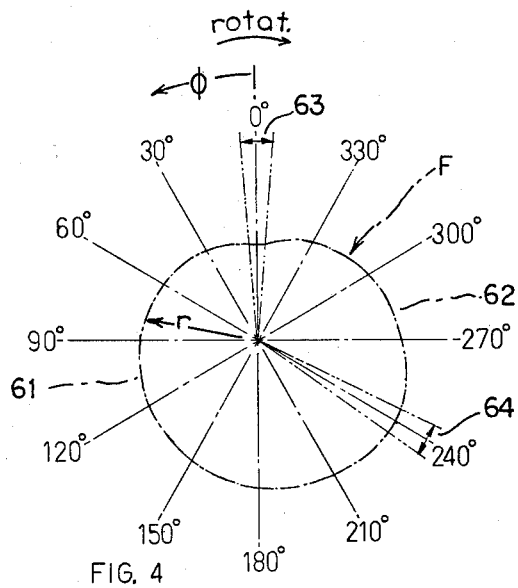
FIG. 4 is a diagramatic representation of a face cam contour.

In the drawings, the housing H supports and encloses, as principal component systems, a main sprocket chain driving system including sprocket chain 11 from sprocketed input shaft 12 to sprocketed output shaft 13; a chain motion modifying or secondary driving system for cyclicly varying the chain motion, hence output shaft motion, within each rotation of the input shaft, including a shiftable idler sprocket carrying slide or carriage C; a face cam disk F keyed on the input shaft; a carriage actuating lever L driven from the input shaft by the cam; and a high-low speed ratio adjusting assembly A, shifting the lever fulcrum pivot point, parallel to housing top wall 14 in response to a setting rotational input applied by external means, say by a signal controlled motor or, as here shown, by a manually set knob K at housing end wall 15.

Input shaft 12 and output shaft 13, both supported by appropriate bearings, e.g., on or in housing side wall 16 and removable opposite sidewall or cover 17, have drive and output sprockets 18, 19 respectively keyed thereto; with appropriate conventional spacing bushings between the shaft-associated elements. The cam disk F thus has simultaneous rotation with drive or input sprocket 12.

Three other operatively fixed idler elements, sprockets 21, 22, 23 with appropriate bearings, are supported by wall 16 in a rectangular array or arrangement with sprocket 19, that is, these sprockets being located at the corners of an imaginary rectangle; the axes of sprockets 19, 21 lying in a horizontal plane coplanar with the input shaft axis, and the axes of the lower pair of sprockets 22, 23 having substantially the same spacing as sprockets 21, 19 in a lower horizontal plane, that is, respectively vertically equi-spaced from the latter.

Shiftable idler sprockets 26, 27 with bearings are secured in fixed close vertical spacing of their horizontal axes by bolting, at 26a, 27a, to the carriage slide rod or bar 28 slideable in bushed vertically aligned apertures of parallel bracket plates 29, 30 welded at right angles to side wall plate 16, for vertical coplanar reciprocation within the "rectangle" defined by 19, 21, 22, 23 in a plane midway between the vertical pairs 21, 22 and 19, 23. The several sprockets proper are of course coplanar.

In contrast with the other fixed idlers secured by bolts, as at 23a, directly to side wall bosses, the sprocket 22 is here shown mounted on a base plate 32 longitudinally slotted for cap screws 33 vertically adjustably securing the sprocket to wall 16, affording not only chain tightening take-up, but also facilitating chain installation with the reentrant chain reeving whereby the chain portions running to sprockets 26, 27 are parallel at all carriage positions.

Slide actuating lever bar L, of non-circular section, square as shown (see FIG. 3) with bifurcated right end embracing, and pivotally secured in a clevis arrangement by pivot pin 35 to the diametrically flatted slide bar or rod top end 28a, at its left end has bolted thereto a cam follower rolller 37 laterally projecting into the face cam groove G, thus providing linkage means from the cam follower to the shiftable idler elements.

An adjustably positionable fulcrum (see also FIGS. 2–3) is provided by a slide block 40 with parallel dependent legs 40a supporting by aligned respective pivots 42 a pair of opposed gib-like plates 41—41 having recessed opposed faces slideably embracing opposite sides of the lever bar.

The block 40 is adjustably slideably positioned, on a pair of parallel rods 44 passed through and having ends secured in the parallel end plates 45 dependent from housing top wall 15, by an elongated setting screw 46 threaded through the block body between and parallel to rods 44, and coplanar with lever bar L. Screw 46 is rotatably journalled in end plates 45 and in housing end wall 15 through which it projects for adjustment setting by external means such as a motor or manual knob K pinned thereto; and a set screw secured inside collar 48 on an unthreaded shank of 46 and an outside element such as knob K cooperates to secure screw 46 against axial reaction shift.

For visual indication of and guidance for the setting, a pointer or indicator element 50 screw-secured to the flat top of block 40 projects upwardly into a top wall slot 51 into proximity with the bottom of an index legend bearing glass or translucent plate 52, set flush into a wall recess as on oil-tight screw-secured cover over slot 51. Preferably the housing is adapted to be oil filled for immersed running of all operating parts.

It being understood that other cam contours may be used for other performance characteristics, indeed that the face cam element F is changeable for such purposes, a particular mode of operation is explained with respect to the cam contour diagramatically represented in FIG. 4.

The elementary observation is first made that with carriage C assumed stationary, (as is the case with axial coincidence of pivots 42 and 35) and with output sprocket 19 of the same size as input sprocket 18, the output shaft motion and speed would be identical with those of the input shaft; or if the sprockets would have different sizes, the rotational speed ratio would of course be the inverse of the size or tooth number ratio. Thus for constant input speed and the carriage stationary, a uniform constant output speed is attained, dependent only on input and output sprocket ratio.

On the other hand, assuming the input sprocket held stationary but the carriage C somehow reciprocated, the output shaft would then undergo a rotationally oscillatory motion; as viewed in FIG. 1, on the down stroke rotating counterclockwise, and on the up-stroke clockwise.

The "rotational displacement", that is, the extent of carriage-shift-caused rotation, is expressed in radians as:

$$\theta = 2d/R, \qquad (1)$$

where $d$ is the carriage displacement or stroke and R is the radius of the output sprocket pitch circle; or $$\theta° = (2d\ 360°)/(pn) = (720d)/(pn), \qquad (2)$$

where $p$ is the chain pitch length and $n$ the number of teeth in the output sprocket. Thus the carriage-caused rotational speed is proportional to the rectilinear speed of the carriage stroke; and for such time that the idler carrying slide is moving at a constant rate, the output shaft rotational rate is constant.

When the pivot axis of the block 40 is non-coincident with the pivot axis of 35, the input shaft rotation, acting directly on the chain through the input sprocket and mediately on the chain through the cam actuated motion modifying system, results in an output which is the sum of these two types of motions.

Assume now, by way of an example, that the output sprocket has $n = 15$ teeth and the chain pitch length $p = \frac{3}{8}$ inch (0.375 inch); and that a nominal maximum stroke of 15/16 inch in the slide would represent an arcuate distance at the sprocket pitch circle of 5 teeth, or five pitches of the chain. Then this represents 5/15 of an output revolution as the maximum motion which may be added or subtracted through the chain; the corresponding output velocities, however, being dependent upon the extent of the input rotation (assuming a 1/1 input signal output sprocket ratio) during which the stroke occurs in the respective directions.

The contour of the cam shown approximately in FIG. 1 is seen more clearly in FIG. 4 by the represented centerline of the cam groove. With an assumed clockwise rotation in FIG. 1 of the input shaft, hence of the cam, from the cam position shown in FIG. 1 where the cam follower position at minimum cam radius is shown in dotted lines, the vertical line between the common input and cam axis and the cam follower roller axis (the cam radius through the cam minimum) is taken as a zero reference line for angular measurements describing the cam shape and operation. The specific cam rises to a maximum radius or height over the first 240° sector 61 and then drops back to the minimum over the remaining sector 62 of 120°.

In order to have a slide motion which is constant with respect to input rotation (therefore constant with respect to time with a constant input rotational speed), the sectors 61, 62 of cam rise and drop will have the cam radius, $r$, changing respectively proportionally to the cam angular position $\phi$, or $$r = c + k\phi, \quad (3)$$

where $c$ is the minimum radius and $k$ is a constant distinct for the two sectors ($k_2 = k_1 \times \frac{1}{2}$); so over practically the entire lengths of the slide bar strokes the rates of linear motion will be respectively constant.

In regions of change from the sector of cam drop to the sector of cam rise and vice versa over the respective small angular extents designated 63, 64, in FIG. 4, there are appropriate curvatures preferably specifically designed from inertial consideration to produce harmonic motions in the carriage slide. The design to attain the harmonic motion may be unneeded where backlash otherwise present in the mechanism may accommodate the positive and negative acceleration forces arising in operation.

Because of a slight arcuate excursion of the point of cam follower-to-cam contact, out of that vertical reference line, a quite small divergence from a constant linear speed theoretically arises. In the cam design, consideration is given for this slight change where it would be objectionable.

Now neglecting the fact that the regions 63, 64 of small angular extent are allocated to harmonic motion, during the first 240° of input rotation, hence cam rotation from the position shown in FIG. 1, for the angular space of 10 teeth, two-thirds of a revolution, which normally (apart from idler sprocket modification of motion) would tend to rotate the output a corresponding 10 teeth or two-thirds of a revolution (240°), the downward slide stroke over the 240° cam rise is in effect taking up a portion, amounting to 5 pitch lengths or 5 teeth, of the corresponding 10 tooth (pitches) chain advance toward the output sprocket, with a corresponding chain length yielding toward the output sprocket at the other shiftable sprocket, so that actually only a 5-tooth displacement or 120° of rotation is imposed on the output shaft during that first 240° of input shaft rotation.

In other words, the output shaft has a rotational speed clockwise which is half that of the input shaft. Thus for the first one-third, or 120° of output rotation, its speed is 50% that of the input.

For the remaining one-third or 120° of the input shaft revolution, the reverse or upward slide action will be occurring with a reverse effect of the shiftable idler sprockets on the chain, so that during the period corresponding to a further 5 tooth angular or rotational displacement of the input shaft, in addition to the corresponding 5 tooth displacement of the chain by the input shaft, there will be an additional 5 pitch or 5 tooth displacement added by the upward reciprocation of slide with the idlers. Hence there is a 10 tooth or 240° output rotational displacement clockwise, while the input is rotating only 5 tooth or pitch spaces. In other words, there will be a doubling of the output shaft speed relative to the input for the last two-thirds, or next 240°, of output rotation.

Considering the two output speeds, expressed in terms of the constant input speed, the ratio of the two output speeds obtained in each cycle is 200%/50% or 4/1 of maximum output to minimum output for this control setting.

Using the prior formula, (2), for the 4/1 setting producing the 15/16 inch stroke, $$\theta = (720d)/(pn) = (720d)/(0.375 \times 15) = 128d;$$

and since Input + Displacement = Output, the Output = Input ± 128d; or more simply Output = Input + (15/16) 128 = Input + 120°.

Thus directly the two outputs in one input revolution or cycle are, for the 240° of input producing the down stroke, 240° − 120° = 120° Output, and (Output speed/Input speed) = 120°/240° = 0.5 or 50%;

and for the remaining 120° of input revolution with upward stroke,

120° + 120° = 240° Output, and (Output speed/Input speed) = 240°/120° = 2.00 or 200%.

Figure 5:
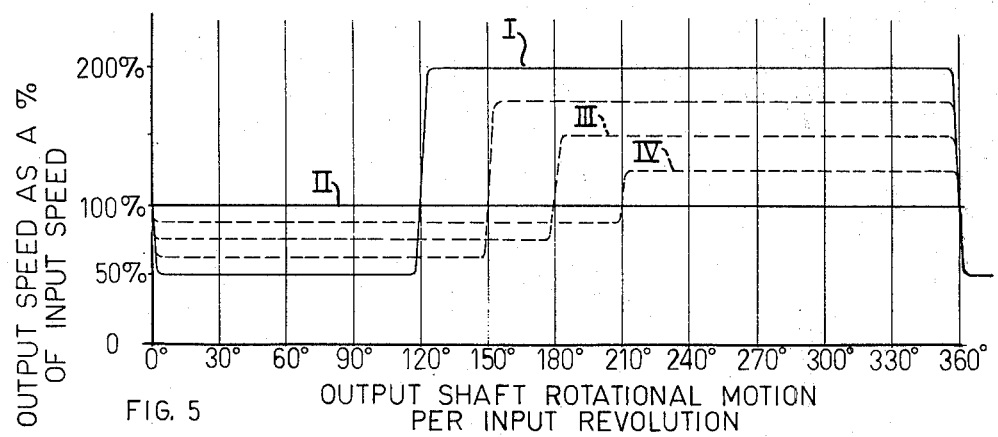
FIG. 5 is a diagram showing the relation of the output speed relative to the input speed.

In the graph of FIG. 5, where the abscissae (horizontal) represent the output shaft rotational motion in degrees per input revolution, the the ordinates (vertical), the output speed as a percentage of input speed, the solid line stepped curve (I) represents the output for the above described cam with the 4/1 setting of slide block 40 at the extreme left. The straight horizontal line (II), at 100%, represents performance where block 40 is at its extreme right position of coincidence of the axes of the pivot 42 and of the pivot 35. As no slide reciprocation occurs, no motion is applied to the sprockets and hence no motion modification produced in the chain. The output speed will be 100% of the input speed; and though the output speed is then constant over each output revolution, since it is 100% for the first 240° of input and 100% for the last 120° of input, or 100%/100%, this is termed as 1/1 setting.

Obviously as block 40 is shifted between extreme positions (left: 4/1 setting for maximum carriage throw; right: 1/1 setting), the high-low output speed ratio is variable continuously rather than step-wise. The thus changeable lever arm ratio is $f(1-f)$; $f$ being the fulcrum pivot spacing from the clevis end expressed as a fraction of the lever length; which ratio itself varies slightly for a given setting by bar slip in the block (hence follower shift) during the cycle due to clevis constraint to rectilinear motion, compensated by cam design as earlier noted. Thus in FIG. 5, between the solid lines I and II for the extreme 4/1 and 1/1 settings, of the family of curves representing for various settings behavior in terms of the instantaneous output speed (relative to the input speed) being obtained at each output shaft position, there are shown other dotted curves for selected positions of the fulcrum block and with the described cam, for brevity termed a 4/1 cam. Thus if the block is moved to the right to halve the slide reciprocation excursion to 15/32 inch per cycle, or moved to the right to obtain a quartering to 15/64 inch, the output rotational displacements ($\theta$) due to the cam induced slide motion are respectively $\theta = 60°$ and $\theta = 30°$, behavior indicated by curves III and IV. For with $\theta = 60°$, the output rotations are 180° for both cam sectors, giving 180°/240° = 75%, and 180°/120° = 150% for the respective cam sectors, giving output-to-input speeds ratios of 210°/240° = 87½% and 150°/120° = 125%, as for 10/7 setting. By a setting selection between the extremes any output speed over a 4/1 range can be attained for a portion of the cycle, that is any speed up to twice the input and down to half the input speed. But for all such settings, the total output shaft rotation per complete input shaft rotation is still 1/1 for the input and output sprockets of equal size.

As a compromise, with a certain degree of phase shift occurring by the setting of the lever fulcrum, without complicating the setting mechanism, the disposition of the latter is such that at the 1/1 setting, the pivot 35 is about midway between its extreme excursions; and the sprocket on the input shaft may be releasably rotationally shiftably connectable thereto, or the output shaft may include a releasable setable coupling connecting it to the driven equipment; so that after a setting of the desired speed ratio, the output shaft could be brought back into the desired relative angular position.

The grooved face cam here shown, because of the positive engagement with the cam follower assured for both directions of slide movement, that is, with the decreasing cam surface radius as well as the rising surface, is preferred to the alternate of a rotary edge cam, where a rather heavy bias spring would be required because of the driven loads, to assure follower contact with the cam periphery; though a single rotary edge cam form readily provides in effect two cams merely by face to face reversals of the same cam on the input shaft to give the notably different output performance of a mirror image of a given cam.

It may be here noted that if at F a cam is substituted having a mirror image of the groove shape above described so that the first cam rise is traversed over the first 120° of the clockwise input shaft rotation, for the 4/1 setting, (15/16 inch carriage slide travel), the corresponding slide induced rotation of 120° for the output would be subtractive exactly from the input, with the output shaft then being stationary, for zero (0) output; but on the next 240° of input, it would be additive, resulting in a complete output rotation, or a speed of 360°/240° or 150%; while at the setting resulting in $\theta = 60°$, the two output speeds would be 60°/120° = 50% and 300°/240° = 125%.

With appropriate cam shaping, even reverse rotation of the output obviously is attainable. For example, with the full cam rise (i.e., producing the full slide stroke) occurring in the first 90°, the output would be 90° − 120° = −30° or −30°/90 = −33%, representing reversal; and for the rest of the cycle 270° + 120° = 390°, or 190°/270° = 144%.

On the other hand, two distinct rates of cam rise may be used in going to the maximum and a single rate of drop over respective sectors, giving three outputs for a given setting.

The 240°& 120° cam above described is especially useful in controlling or driving a plate cylinder in printing operations, where the cylinder makes periodic contact with a web since it allows maximum use of the cylinder circumference for the image for the nominal speed.

A device of this character has many useful applications; those especially involving a driving a system for continuously advancing or driving an object, which is to be in some way correlated or synchronized with operations performed upon that object as it is moved, whether the object be moved rotationally or in linear sense.

Particularly noteworthy is the situation in which there is driving continuously of a web upon which an operation, such as imprinting, sealing, cutting, spot adhesive application or the like, is to be carried out on the web at spaced longitudinal locations, especially where it may be desirable that the overall apparatus be adapted to carrying out successively repeated operations of the character broadly described at different intervals.

In such cases, a principal drive source, having a pre-established drive or motion transmitting relationship to the main drive for the web, also drives the operative or tool equipment in question through the variable driver synchronizer as above described.

Printing operations, for example, on a continuous web present a particularly advantageous use. For in such circumstances, in view not only of the cost of equipment, but labor charges for making setting changes, in the machine, also down time of the machine for such work, may often be highly significant economically.

As a detailed particular example, consider a single station flexographic unit which is printing a 4 inch print length every 16 inches on a continuously moved web; that is, with a 16 inch repeat. The effective circumference of the plate roll must be 16 inches to provide a surface speed matching that of the moving web.

Printing the same 4 inch impression on an 8 inch repeat, that is, every 8 inches, is easily accomplished by installing a second 4 inch plate on the same plate roll, so that two impressions will be made for each revolution of the 16 inch circumference roll. However, if so desired to print the same impression on any other repeat lengths, the plate roll and its driving gear must be changed.

Thus to print a 24 inch repeat, a new plate roll must be used having an effective circumference of 24 inches. Repeat lengths which are sub-multiples of 24 inches may be printed with that same plate roll, by mounting a corresponding number of plates on the roll; e.g., four plates to print four 6 inch repeats, three plates for three 8 inch repeats, to two plates for two 12 inch repeats. However, since the effective plate roll circumference must always be equal to or a multiple of the repeat length to be printed, if a 6½ inch or 12¼ inch repeat is required, this necessitates considerable labor; thus, in a multi-color press, the plate cylinder and plate cylinder drive gear at each color station must be changed with each change in repeat. As the gear teeth are usually one fourth inch circular pitch, repeats must be selected in multiples of ¼ inch.

If a flexographic printing installation has a plate roll of 16 inches effective circumference directly connected to the output of the variable synchronizer, with its adjustment set at 1/1, the plate roll will rotate at constant speed and will print every 16 inches. If the adjustment is then set at maximum, the plate roll will rotate twice as fast for two-thirds of a revolution and half as fast for one-third of a revolution. If the printing plate is installed on the sector of the plate roll which contacts the web during the fast part of the roll cycle, it will print at every 32 inches of web travel. The web speed must be adjusted by means of a varibable speed drive to run 32 inches of web per revolution of the plate roll. In effect, the plate roll speeds up to the surface speed of the web during printing and then slows down to "wait" for the next repeat.

With the plate installed on that plate roll sector which contacts the web during the slow part of the roll cycle, it will print every 8 inches of web travel. Again, the web speed must be adjusted by means of the variable speed drive to run 8 inches of web per plate roll revolution, that is, per revolution of the variable synchronizer input shaft.

Thus repeats of 8, 16, and 32 inches can be printed with the same 16 inch circumference cylinder or plate roll The continuous adjustment of the synchronizer from minimum to maximum will permit any repeat from 8 inhes to 32 inches to be printed without plate roll change.

With the variable synchronizer and a variable spped drive for the web pull rolls driven from a common main drive, and appropriate controls whereby the variable synchronizer is adjusted simultaneously with the variable speed web adjustment, to print repeats from 8 inch to 16 inch, the variable synchronizer is adjusted from maximum to minimum proportionally as the variable speed drive is adjusted from minimum to nominal speed. To print from 16 inches to 32 inches, the variable synchronizer is adjusted from minimum to maximum proportionally as the variable speed drive is adjusted from nominal to maximum speed.

The variable synchronizer can be applied in much the same manner to plastic bag heat sealing operations. Other similar applications include rotary cutters, flying shears, etc.

For example, in a rotary cutter as commonly used on bag machines and sheeters, one blade rotates relative to a stationary anvil blade; a cut being made each time the rotary blade strikes the anvil. Sheet or bag lengths may be changed by speeding up or slowing the moving web. To obtain a clean cut off, it is necessary that the surface speed of the knife match that of the moving web at the instant of cut off. In the usual device, the rotary knife is driven through a pair of elliptical gears, being attached to the driven gear, which will vary continuously in speed from one-half to twice the rpm of the input or driving gear. For an input speed of 100 rpm, the knife will rotate from 50 rpm to 200 rpm twice for each revolution of the knife. By adjusting the angular position of the knife to the driven gear, the proper instantaneous speed that will permit the knife to match the surface speed of the material at the instant of cut off can be selected.

Use of the variable synchronizer for this application advantageously provides a running adjustment for all sizes from 8 inches to 32 inches, for example.

I claim:

1. A continuously variable mechanical motion synchronizer device having a rotary input and rotary output comprising:

a housing supporting a rotary input shaft and a rotary output shaft;

principal transmission means for communicating rotational motion from the input shaft to the output shaft, and including operatively fixed and shiftable elements having fixed location and shiftable location respectively in the housing;

motion modifying means including a rotary cam rotationally driven by said input shaft, directly or indirectly by means separate from said transmission means, at a constant relation of input and cam speeds, a cam follower, and linkage means connecting the cam follower to a said shiftable element to shift the latter element relative to the fixed elements and thereby supply a motion component algebraically additive to the motion transmitted by the principal transmission means to the output shaft, said cam, cam follower and linkage being adapted to produce cyclicly at least two motion components which are respectively constant relative to the input motion over respective pre-determined intervals; and means for selectably adjusting said linkage means while the device is in operation to vary the ratio of said two motion components.

2. A device as described in claim 1, wherein said principal transmission means comprises a sprocket chain drive including a driving input shaft sprocket, a driven ouput shaft sprocket, and a sprocket chain operatively connecting said sprockets; and said fixed shiftable elements comprise at least one idler sprocket at fixed location in the housing and said driving and driven sprockets, and an idler sprocket shiftable in the housing by said linkage means to increase and decrease the length of a chain portion between the two successive fixed sprockets, said device including means to decrease and increase the length of another chain portion in amounts equal to the increase, and, decrease in the first portion.

3. A device as described in claim 2, wherein said linkage means comprises:

a slide bar reciprocably mounted in the housing and supporting said shiftable idler sprocket, and a lever bar pivotally connected to said slide bar and carrying said cam follower and having a fulcrum supported on the housing;

and said means for selectably adjusting said linkage comprises a slide block linearly slideably adjustably supported on the housing, and pivot, means pivoted on said slide block and embracing and longitudinally slideably receiving said lever bar, to provide the fulcrum.

4. A device as described in claim 3, wherein said cam follower and slide bar are connected to opposite ends of the lever bar;

said pivot means being slideable into pivot axis coincidence with the connection of the lever bar to slide bar.

5. A device as described in claim 3, including an elongated screw rotatably mounted in said housing coplanar with said lever bar and having a threaded engagement with said slide block;

said screw having a shank adapted for application of a rotational, fulcrum-setting input.

6. A device as described in claim 1, wherein said principal transmission means comprises a sprocket chain device including,
- a plurality of sprockets operatively fixed in the housing and providing said fixed elements,
- said plurality including a rectangular four-sprocket array,
- said plurality including
  - a driving input shaft sprocket and
  - a driven ouput shaft sprocket,
- said array including at least two idler sprockets;

said sprockets providing said fixed elements;

a pair of shiftable sprockets as said shiftable elements and having an operatively fixed spacing to each other, and shiftable within the confines of the rectangular array, and a sprocket chain reeved about said sprockets;

said linkage means comprising
- a slide bar reciprocable in the housing midway between opposed sprocket pairs of said array and having said pair of shiftable sprockets longitudinally spaced thereon, and
- a lever bar having a fulcrum supported on the housing,
- a pivotal connection at one end to said slide bar, and carrying said cam follower.

7. A device as described in claim 6, wherein said cam has a camming surface contoured with a first rising cam sector and a second dropping cam sector, over the major angular extents of which the radius of the camming surface is changing at respectively constant angular rates, excepting at transition regions, thereby to impart constant linear rates of travel to said slide bar, said transition regions being contoured to produce respective harmonic motions in said slide bar in reversing at the end of each stroke.

8. A device as described in claim 7, wherein said cam is a face having a cam groove with a roller engaged therein as a follower.

9. A device as described in claim 6, wherein said means for selectably adjusting said linkage means comprises a slide block linearly sldeably adjustably supported on the housing, a pivot means pivoted on said side block and embracing and longitudinally slideably receiving said lever bar to provide the fulcrum.

10. A device as described in claim 9, wherein said cam follower and slide bar are connected to opposite ends of the lever bar;

said pivot means being slidable from positions intermediate said ends into pivot axis coincidence with the lever bar to slide bar connection.

11. A device as described in claim 9, including an elongated screw rotatably mounted in said housing coplanar with said lever bar and having a threaded engagement with said slide block; said screw having a shank adapted for application of a rotational, fulcrum-setting input.

12. A device as described in claim 11, wherein said slide block is supported proximate to and for sliding parallel to a housing wall and carries an indicator element disposed toward the last said wall;

the last said wall having a slot therethrough over the path of the indictor element;

said slot being closed by a translucent plate bearing setting indicating legends.

* * * * *